United States Patent
Nylund

(10) Patent No.: US 6,876,713 B2
(45) Date of Patent: Apr. 5, 2005

(54) FILTER AND FUEL ASSEMBLY FOR A LIGHT-WATER NUCLEAR REACTOR

(75) Inventor: Olov Nylund, Västerås (SE)

(73) Assignee: Westinghouse Atom AB (SE)

( * ) Notice: Subject to any disclaimer, the term of this patent is extended or adjusted under 35 U.S.C. 154(b) by 0 days.

(21) Appl. No.: 10/468,291

(22) PCT Filed: Mar. 6, 2002

(86) PCT No.: PCT/SE02/00392

§ 371 (c)(1),
(2), (4) Date: Aug. 19, 2003

(87) PCT Pub. No.: WO02/075746

PCT Pub. Date: Sep. 26, 2002

(65) Prior Publication Data

US 2004/0071255 A1 Apr. 15, 2004

(30) Foreign Application Priority Data

Mar. 20, 2001 (SE) .............................. 0100972

(51) Int. Cl.⁷ .............................................. G21C 19/42
(52) U.S. Cl. ..................... 376/313; 376/352; 210/483; 210/489
(58) Field of Search ................ 376/313, 352, 376/437; 210/171, 483, 489

(56) References Cited

U.S. PATENT DOCUMENTS

| | | | | |
|---|---|---|---|---|
| 3,743,578 A | * | 7/1973 | Agranier et al. | 376/437 |
| 3,755,077 A | * | 8/1973 | Agranier et al. | 376/437 |
| 3,831,753 A | * | 8/1974 | Gaylord et al. | 209/399 |
| 3,951,739 A | * | 4/1976 | Frick et al. | 376/437 |
| 4,634,525 A | * | 1/1987 | Yant | 376/313 |
| 4,648,354 A | * | 3/1987 | Holcblat et al. | 376/352 |
| 4,684,496 A | * | 8/1987 | Wilson et al. | 376/313 |
| 4,919,883 A | * | 4/1990 | Bryan | 376/313 |
| 5,030,412 A | | 7/1991 | Yates et al. | |
| 5,225,152 A | * | 7/1993 | Verdier | 376/313 |
| 5,230,861 A | * | 7/1993 | Nylund | 376/352 |
| 5,390,220 A | * | 2/1995 | Zuloaga et al. | 376/313 |
| 5,471,514 A | * | 11/1995 | Soderlund | 376/313 |
| 5,473,649 A | * | 12/1995 | Olsson et al. | 376/313 |
| 6,175,606 B1 | * | 1/2001 | Soderberg | 376/352 |
| 6,254,774 B1 | * | 7/2001 | Henderson | 376/313 |
| 6,310,931 B1 | * | 10/2001 | Gustafsson et al. | 376/437 |

FOREIGN PATENT DOCUMENTS

| | | |
|---|---|---|
| DE | 296 15 575 | 2/1997 |
| EP | 0 432 739 | 6/1991 |

* cited by examiner

Primary Examiner—Harvey E. Behrend
(74) Attorney, Agent, or Firm—Swidler Berlin LLP

(57) ABSTRACT

A filter for separating particles from cooling water in a nuclear plant of light water model. The filter has an inlet end (2) and an outlet end (3) and allow flowing through of the cooling water in a flow direction z from the inlet end to the outlet end. The filter comprises a plurality of channels (5) extending mainly in the flow from the inlet end to the outlet end. Each of the channels comprise a first (6) channel section provided closer to the inlet end, a second (8) channel section arranged closer to the outlet end, and an intermediate section (7) provided between the first and the second channel section. The intermediate section (7) has an extension $d_2$ in a direction x transversely to the flow direction, which is essentially larger than the extension $d_1$, $d_3$ of the first and the second channel section. The filter further comprises a separating member (9) arranged in the intermediate section. The intermediate section and the separating member are arranged so that at least one bent passage (10, 11) for the cooling water formed between the separating member and the wall of the intermediate section.

16 Claims, 4 Drawing Sheets

FILTER AND FUEL ASSEMBLY FOR A LIGHT-WATER NUCLEAR REACTOR

FIELD OF THE INVENTION

The present invention relates to a filter for separating particles from the cooling water in a nuclear plant of a light-water model, the filter having an inlet end and an outlet end and is arranged for permitting flowing-through of the cooling water in a main flow direction from the inlet end to the outlet end, the filter comprising a plurality of channels mainly extending in the flow direction from the inlet end to the outlet end, each of the channels comprising a first channel section provided closer to the inlet end, a second channel section arranged closer to the outlet end an intermediate section provided between the first and the second channel section. The invention also relates to a fuel assembly according to the preamble of the claim 17.

The invention will be described in an application for nuclear plants, for purifying the cooling water flowing through a nuclear plant of light-water type, from waste material and other particles. However, the invention is not limited to any particular location of the filter in the nuclear plant.

PRIOR ART

It is important to purify the cooling water in a nuclear plant. The purpose of the cooling water is to act as a cooling medium and as a moderator in the nuclear reactor of the nuclear plant. If waste material or other particles are allowed to come with the cooling water in the reactor core, they may cause damages to the cladding of the fuel rods, which might lead to such damages that the nuclear fuel, i.e. uranium, will leak out into the cooling water. At larger damages, the operation of the reactor has to be shut down and the defect fuel has to be changed. Such a change is time consuming and expensive. Waste material and other particles may, of course, also cause damages to other components in the nuclear plant, such as pumps.

Such waste material may consist of shavings, which are formed in connection with repair of different components in the plant, metal wires or other foreign particles which have come from outside into the plant. Particularly troublesome particles are such with an extended shape, i.e. narrow wires or shavings, which might be as small as about 10 mm long. Such particles tend to get caught further up in the fuel assembly, for example in a spacer. The particles are vibrating in the cooling water flow and might rub holes in the cladding of the fuel rods. At the same time, it is also important not to filter particles considered as harmless, since everything being couth in the filter increases the pressure fall over it. Such particles may, for example, be blasting sand with the size of 1–2 mm and mineral wool particles, which may have come into the cooling water by accident.

To solve this problem it is known to provide some kind of filter in the lower part of the fuel assembly, which comprises a number of fuel rods and forms the reactor core. The cooling water circulating through the reactor passes through this lower part of the fuel assemblies. For example, the base plate of the fuel assembly might be provided with a number of small holes, through which the cooling water passes. Thus, such a filter may catch possible waste material or other particles. Two important demands are put on such a filter, on one hand it must be able to effectively catch all the particles, which might cause damages to the reactor, and on the other it shall have a low flow resistance and pressure fall. U.S. Pat. No. 5,030,412 shows such a filter for catching waste in the cooling water flowing through a nuclear reactor. The filter consists of a number of parallel sheets arranged close to each other forming passages for the cooling water. Those passages are long and narrow and have an inlet part and an outlet part, and an intermediate bent part preventing a large portion of the particles from passing through the filter. Such a filter certainly prevents the particles from penetrating further up in the fuel assembly, but it does not prevent all particles above a certain size from continuing farther.

SUMMARY OF THE INVENTION

The object of the present invention is to provide a filter, which effectively filters the particles above a certain size. Further, it is desired to provide a filter having a robust construction, which can be manufactured in one part without the need of welding.

This object is achieved by the initially mentioned filter, which is characterised in that the intermediate section has an extension in a direction transversely to the flow direction, which is essentially larger than the extension of the first and the second section channel section in said direction, and in that the filter comprises a separating member arranged in the intermediate section, wherein the intermediate section and the separating member are arranged so that at least one bent passage for the cooling water is formed between the separating member and a wall of the intermediate section.

Thanks to the bent passage, such a filter can effectively catch particles in the cooling water, which particles are transported with its extension extending essentially along the flow direction. The filter can easily be manufactured by cutting and boring the channels directly in a plate, and thereafter inserting the separating members into the channels. Thus, the filter can be manufactured out of one piece without any welded seams and thus becomes robust and durable.

According to an embodiment of the invention, the channels also extend in a second direction transversely to said first direction, and the channels are arranged essentially parallel to each other. Such a design contributes to limiting the flow resistance.

According to a further embodiment of the invention, the separating member is shaped as a cylinder substantially extending in said second direction transversely to the flow direction. Advantageously, the separating member extends essentially over the entire length of the channel, wherein a bent passage for the cooling water is formed on each side of the separating member.

According to a further embodiment of the invention, the separating member has a diameter, in a direction transversely to the flow direction, which is larger than the diameter of the first and the second channel section. With such a design, all particles in the cooling water are stopped, which particles are transported with their longitudinal axis essentially in the flow direction and which have a length which is larger than the extension of the intermediate section in the direction of the flow. Thus, it is possible to decide a lower limit for the size of the particles to be caught by the filter.

According to a further embodiment of the invention, the separating member comprises a plurality of protruding elements being arranged at a distance from each other along the longitudinal axis of the separating member. Advantageously, said protruding elements are shaped as flanges surrounding the separating member. Such an arrangement will also catch particles being transported with an extension mainly extending transversely to the flow direction. The distance between the protruding elements sets an upper limit for the size of the particles to be caught by the filter.

According to a further embodiment of the invention, the distance between the protruding elements is essentially equal to the extension in the flow direction of the intermediate section. The distance between the protruding elements and the extension of the intermediate section in the flow direction decides which size of the waste is permitted to pass through the filter. Accordingly, it is possible to design the filter such that it catches particles above a certain size independent of the direction of the longitudinal axis of the particles. Also, the design of the filter determines in a well-defined way the size of the waste to be filtered.

According to a further embodiment of the invention, the walls of the intermediate section are concave. Concave walls give a soft curved flow-path without any sharp edges, leading to a calm flow and thus a low pressure fall. Preferably, the separating member has a bending essentially corresponding to the bending of the walls in the intermediate section. Accordingly, a directed flow is obtained, which does not give rise to any unnecessary turbulence, which in turn causes pressure fall.

According to a further embodiment of the invention, the centre line of the intermediate section is essentially concentric to the centre line of the separating member. Thus, a symmetric flow is achieved on both sides of the separating member.

According to a further embodiment of the invention, the intermediate section is essentially circular in a section parallel to the flow direction. Advantageously, the separating member also has an essentially circular cross-section. This is advantageous from a manufacturing point of view. In another embodiment, the separating member may have an elliptical cross-section which is advantageous from a flow point of view.

According to a further embodiment of the invention, the first channel section has a flow area of, which is essentially equal to the area of flow in the intermediate section. Thus, a good balance between flow resistance and catching ability is achieved.

According to a further embodiment of the invention, two neighbouring channels have intermediate sections arranged at different distances from the inlet end. This is advantageous since it is possible to locate the channels closer to each other so that more channels can be arranged on the same surface. This means that the flow resistance is limited.

According to a further embodiment of the invention, the filter comprises a plurality of grooves arranged on the surface of the inlet end and arranged essentially transversely to the longitudinal direction of the channels. Such grooves catch long and narrow waste such as wires, thanks to the fact that they lay down in the grooves. Accordingly, a portion of the waste is prevented from entering into the filter and obstructing the flow paths. Waste in the flow paths contribute to increasing the pressure fall.

DESCRIPTION OF DRAWINGS

The present invention will now be explained by the description of different embodiment examples and with reference to the appended drawings.

DESCRIPTION OF EMBODIMENTS

Figure 1:
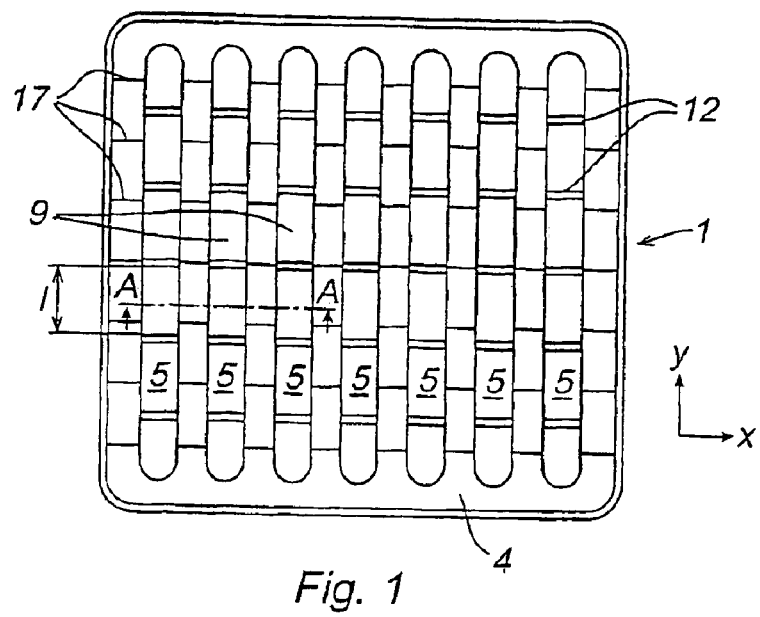
FIG. 1 shows a top view of a filter according to the invention.
Figure 2:
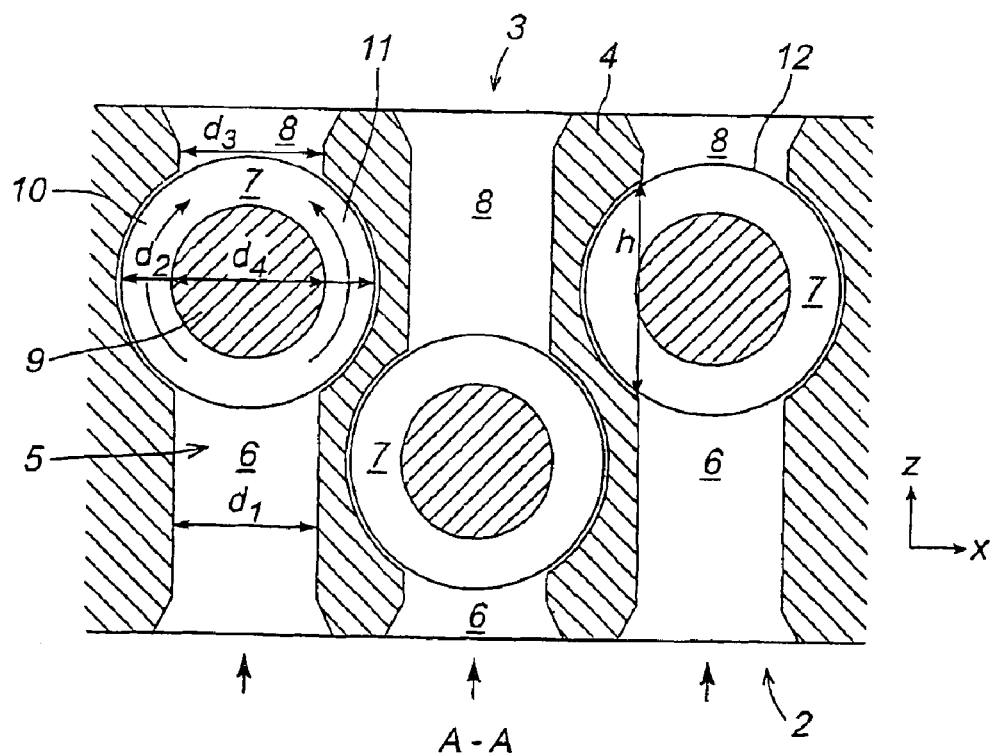
FIG. 2 shows a cross-section A—A through the filter in FIG. 1.

The FIGS. 1 and 2 show a filter 1 for separating particles from the cooling water in a nuclear plant. The filter 1 has an inlet end 2 and an outlet end 3. The cooling water may thus flow through the filter 1 from the inlet end 2 to the outlet end 3 in a main flow direction z.

The filter 1 comprises an essentially rectangular solid plate 4, in which a number of elongated spaces 5 are arranged. The plate 4 is made of a metallic material, for example stainless steel. The spaces 5 are parallelly arranged and extend along the main part of the length of the plate 4 in a direction y transversely to the flow direction. The spaces 5 extend through the entire plate 4 in the flow direction z and have openings in the inlet end 2 and the outlet end 3 so that the cooling water can flow through the filter 1. The spaces 5 define channels, through which the cooling water has to pass before reaching the fuel rods.

As shown in FIG. 2 the spaces 5 comprise a first section 6, an intermediate section 7, and a second section 8. The first section 6 is arranged close to the inlet end 2 and has an extension $d_1$ in the direction x transversely to the flow direction. The second section 8 is arranged close to the outlet end 3 and has an extension $d_3$ in the direction x transversely to the flow direction. The intermediate section 7 is arranged between the first and the second section and has walls, which are concave. The walls in the first and the second section are essentially straight. Transversely to the flow direction z the space 5 has in the first, the second, and the intermediate section an essentially rectangular cross-section. In a plane comprising the flow direction z and the direction x, the intermediate section 7 has an essentially circular cross-section with a diameter $d_2$. In this plane, the intermediate section 7 has an inlet chord, which is equal to the extension $d_1$ of the first section 6. Thereafter, the space 5 widens and on its widest part, the intermediate section 7 has an extension $d_2$. Thereafter, the space 5 tapers and the intermediate section 7 has an outlet chord which is equal to the extension $d_3$ of the second section 8. The intermediate section 7 also has a width in the direction x which is larger than the width of the first 6 and the second 8 section.

The width $d_1$, $d_3$ of the first and the second sections 6, 8 in the direction x may be in the order 3–5 mm, for example 4 mm. The width $d_2$ of the intermediate section 7 in the direction x may in its widest part be in the order 7–9 mm, for example 8 mm. The length of the space 5 in the direction y may be in the order 50–150 mm. The height of the plate 4, which is the height of the space 5 in the flow direction z, may be 15–30 mm, for example 20 mm.

The filter 1 further comprises a number of separating members 9 in the form of elongated circular cylinders, which are arranged in the middle of the intermediate section 7. The separating member 9 extends along the length of the intermediate section, in the direction y, and is arranged so that its centre axis coincides with the centre axis of the intermediate section 7, i.e. the separating member 9 is arranged concentric with the intermediate section 7. The separating member 9 is in its outer ends joint to the plate 4. For preventing long and narrow particles, which has their longitudinal axis directed parallel to the flow direction z, from following the cooling water through the filter, the separating member 9 has a diameter $d_4$, which is somewhat larger than the widths $d_1$ and $d_3$ of the first 6 and the second 8 section. The diameter $d_4$ of the separating member 9 may be in the order 3–5 mm, for example 4.1 mm.

The separating member 9 divides the space in the intermediate section 7 so that it forms two bent passages 10, 11 for the cooling water between the first 6 and the second 8 section. The bent passages 10, 11 thus have a bending in one plane, which comprises the flow direction z and the direction x. The passages 10, 11 are formed between the separating member and the walls of the intermediate section 7, which mean that a passage is formed on each side of the separating member 9. For both passages 10, 11 applies that they have equal and in each cross-section a constant flow area. For limiting the pressure fall, the sum of the flow areas in both passages 10, 11 is approximately equal to the flow area in the first section. The particles accompanying the cooling water are caught in the bent passages. The height h of the intermediate section in the flow direction z determines the size of the particles allowed to pass through the filter. Thus, all long and narrow particles having a size larger than the height h are stopped if they are transported parallel to the flow direction. The height h may be in the order 5–15 mm, for example 7 mm.

For preventing long and narrow particles having their longitudinal axis directed transversely to the flow direction z, from accompanying the cooling water straight through the filter, the separating member 9 is provided with a plurality of flanges. Those flanges are arranged at equal distances along the whole length of the separating member. The flanges 12 extend from the separating member in a direction towards the walls of the intermediate section. The distance I between the flanges determines the size of the particles to be caught and may be in the order 5–15 mm, for example 7 mm. To fit in the intermediate section, the diameter of the flanges shall be a little smaller than or equal to the diameter $d_2$ of the intermediate section, i.e. in the order 7–9 mm, for example 7.9 mm.

As evident from FIG. 2, the neighbouring spaces 5 have their intermediate sections 7 with the separating members 9 arranged displaced in relation to each other in the flow direction z, i.e. they are arranged at different distances from the inlet end 2. Accordingly, it is possible to decease the distance between the channels and consequently there is room for more channels in the plate. The more space there is for channels, the less pressure fall causes the filter.

The cooling water flowing through the spaces 5 in the filter from its inlet end 2 to its outlet end 3 will first pass through the first section 6 and when it then passes through the intermediate section 7, the flow is divided into two partial flows, wherein the first partial flow passes the first bent passage 10 and the second partial flow passes through the second bent passage 11. Thereafter, the partial flows converge and the flow passes through the second channel section 8. Particles above a certain size, which are transported with their length axis essentially parallel to the flow direction, are caught in the bent passages 10, 11 and particles transported with their length axis essentially transversely to the flow direction are caught by the flanges 12.

For catching a portion of the waste before it enters the filter and thus preventing pressure fall in the filter due to it being clogged with waste, the surface of the inlet end of the filter 1 is provided with a number of longitudinal grooves 17 extending transversely to the longitudinal axis of the spaces 5.

Figure 3:
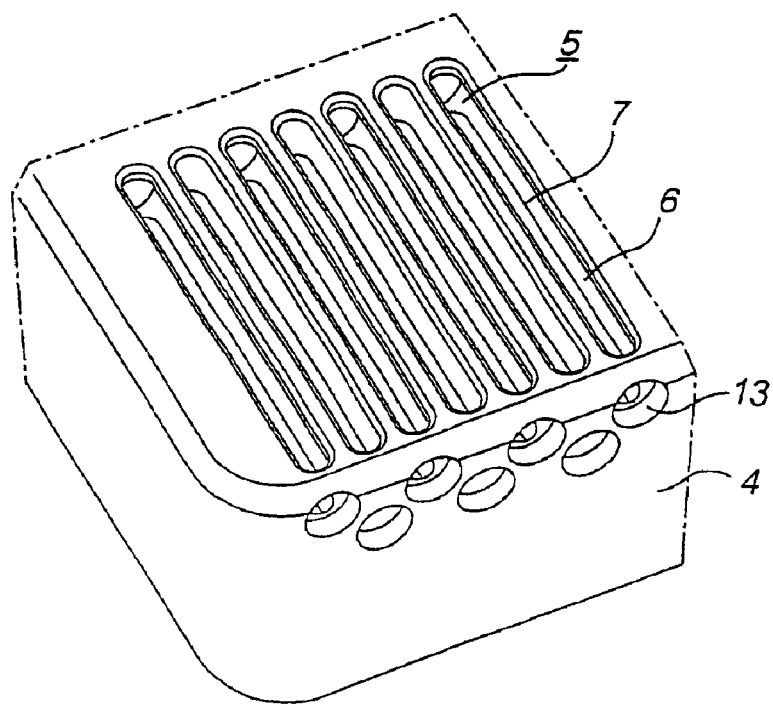
FIG. 3 shows a perspective view of a part of a filter according to the invention.

FIG. 3 shows how the spaces 5 are arranged in the solid plate 4. The channels are, for example, manufactured by boring a plurality of circular holes 13 from one end of the plate. The holes are bored in two different levels, i.e. with two different distances from the top side of the plate. Every second hole is bored in the first level and every other hole is bored in the second level. Thereafter, longitudinal slits are cut from underside of the plate 4, which slits extend through the bored holes 13 and out through the top side of the plate 4. The bored holes 13 form the intermediate section 7 and the rest of the slits form the first 6 and the second 8 channel section. Of course, it is also possible to first cut the slits and then bore the holes.

Figure 4:
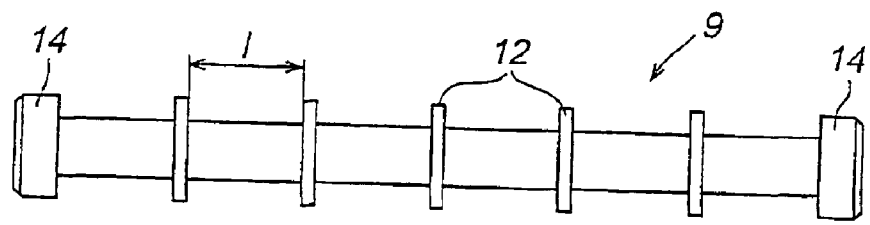
FIG. 4 shows a separating member.

FIG. 4 shows a separating member 9 intended for being brought into the bored holes 13 in FIG. 3. Both ends of the separating member is provided with fixing elements 14, which are adapted so that they fix the separating member 9 to the plate 4, for example by force fit, when the separating member has been brought into the plate 4 through the hole 13.

Figure 5:
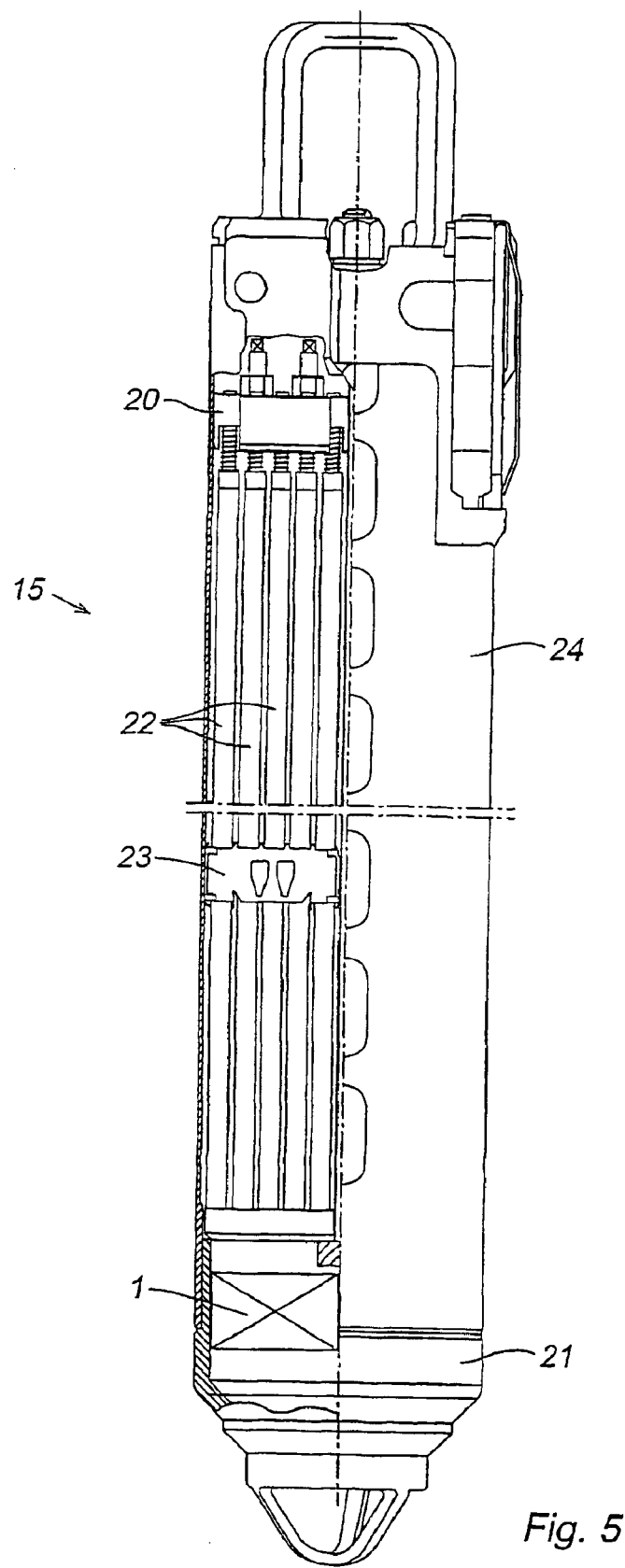
FIG. 5 shows a schematic side view of a fuel assembly for a boiling water reactor.
Figure 6:
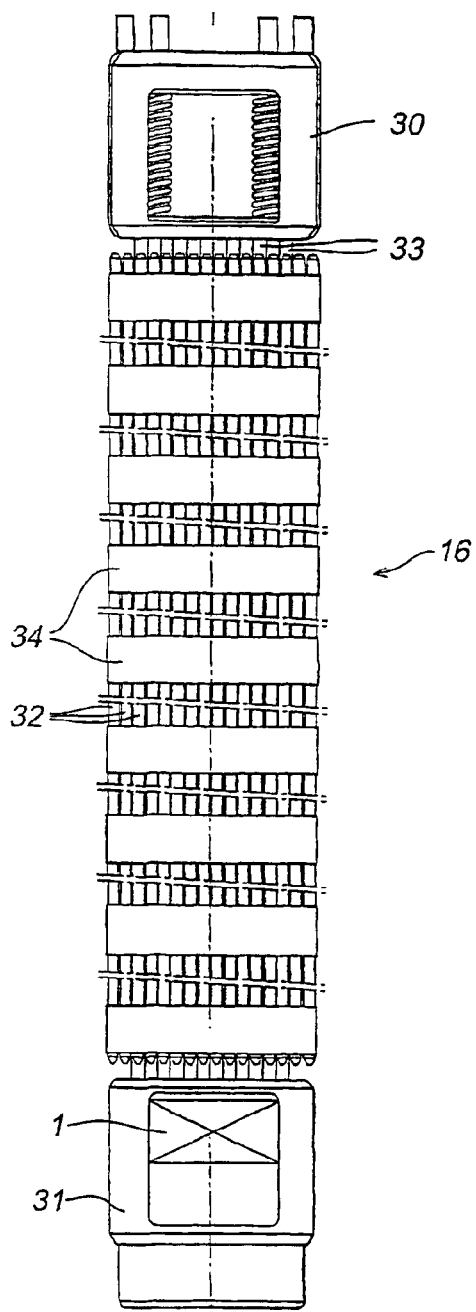
FIG. 6 shows a schematic side view of a pressure water reactor.

The filter 1 is particularly suitable, but not exclusively, for being mounted in a fuel assembly for a nuclear plant. The FIGS. 5 and 6 show two different types of fuel assemblies 15 and 16, which are suitable for including the filter 1. FIG. 5 shows a fuel assembly 15 intended for a boiling water reactor, BWR, which fuel assembly comprises a top part 20 and a bottom part 21. A number of fuel rods 22 are arranged between the top part 20 and the bottom part 21. The fuel rods 22 are in their lower ends joined to the bottom part 21 and it their upper ends joined to the top part 20. The fuel assembly 15 further comprises spacers 23, which are apportioned along the length of the fuel rods 22 and the purpose of which is to keep the fuel rods 22 in a desired position. Further, the fuel assembly comprises a housing 24 extending between the top part 20 and the bottom part 21 and including all the fuel rods 22. A filter 1 according to the description above is arranged in the bottom part 21. A filter 1 is schematically indicated in FIG. 5. The fuel assembly 15 is adapted to allow the cooling water to flow into the fuel assembly through the bottom part 21 and in between the fuel rods 22.

Figure 7:
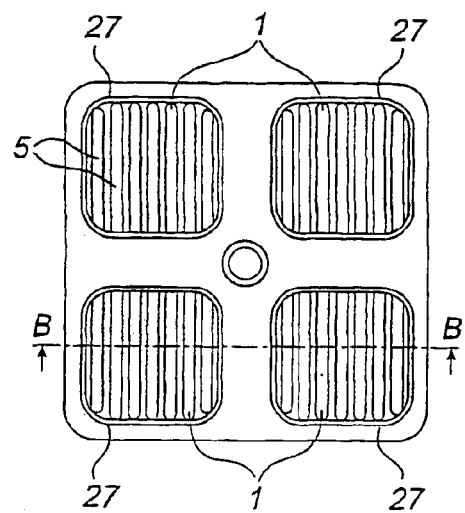
FIG. 7 shows a top view of a bottom part of the fuel assembly in FIG. 5.
Figure 8:
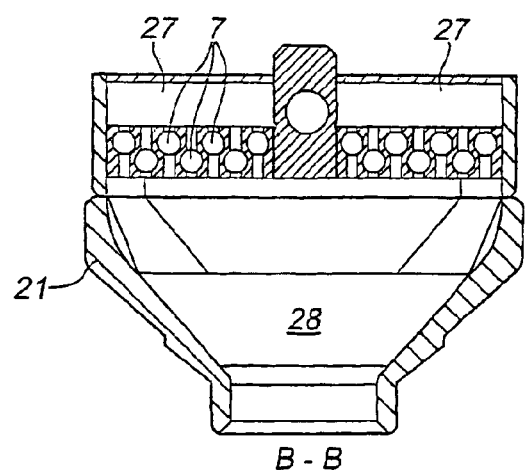
FIG. 8 shows a cross-sectional view from the side of the bottom part in FIG. 7 along the line B—B in FIG. 5.

The bottom part 21 is closer shown in the FIGS. 7 and 8. From the FIGS. 7 and. 8 it is evident that the fuel assembly comprises four filters 1, which each are located in an essentially square opening 27 of the bottom part 21. The filters 1 are arranged parallel to each other and the cooling water flowing into the bottom part 21 via an inlet opening 28 will flow through any of the filters 1. It is further evident from FIG. 8 that the intermediate sections 7 are arranged in two levels, and that two neighbouring channels have intermediate sections 7 at different levels. It shall be noted that the bottom part 21 could also comprise one single large opening 27 having one large filter 1. This filter could, for example, be machined from a solid plate and later provided with separating members.

FIG. 6 shows a fuel assembly 16 for a pressure water reactor, PWR. The fuel assembly 16 also comprises a top part 30, a bottom part 31, and a number of fuel rods 32. Furthermore, the fuel assembly 16 comprises a number of guide pipes 33 extending between and joined to the bottom part 31 and the top part 30. The fuel rods 32 are held by assistance of spacers 34 which are joined to the guide pipes 33. The filter 1 is also in this case arranged in the bottom part 31 and is schematically drawn in FIG. 6. The cooling water which flows into the fuel assembly between the fuel rods 32 will thus also flow through the filter 1. In this embodiment, shown in FIG. 6, the fuel assembly 16 comprises only one single filter covering the entire area of the bottom part 31 shown in the horizontal section, but also in this case the fuel assembly could, of course, comprise a plurality of filter 1, for example four.

The invention is not limited to the embodiments shown but can be varied and modified within the scope of the following claims. For example, it is possible to manufacture such a filter in the form of parallel profiled bars, which are joined at a chosen distance by use of side sections, which also fixes the separating members.

What is claimed is:

1. A filter for separating particles from cooling water in a nuclear plant of light-water model, the filter having an inlet end and an outlet end and is adapted for permitting flowing through of the cooling water in a main flow direction from the inlet end to the outlet end, the filter comprising a plate defining a plurality of channels extending mainly in the flow direction from the inlet end to the outlet end, each of the channels comprising a first channel section provided closer to the inlet end, a second channel section provided closer to the outlet end, and an intermediate section provided between the first and the second channel sections, wherein:

the intermediate section has a dimension in a first direction transversely to the flow direction which is larger than corresponding dimensions of the first and the second channel sections in said first direction, the filter comprises an elongate separating member arranged in the intermediate section, the intermediate section and the separating member are arranged in spaced relation with one another so that at least one bent passage for the cooling water is formed between the separating member and a wall of the intermediate section, the channels extend in a second direction substantially in parallel to each other and transversely to said first direction and the flow direction, and the elongate separating member is cylindrical and arranged with a longitudinal axis extending in said second direction transversely to the flow direction.

2. A filter according to claim 1, wherein the intermediate channel section has a length perpendicular to the flow direction and the separating member extends substantially over the entire length, wherein a curved passage for the cooling water is formed on each side of the separating member.

3. A filter according to claim 1, wherein the separating member has a dimension in a direction transversely to the flow direction which is larger than the corresponding dimensions of the first and the second outlet sections.

4. A filter according to claim 1, wherein the separating member comprises a plurality of protruding elements being arranged at a distance from each other along the longitudinal axis of the separating member.

5. A filter according to claim 4, wherein said protruding elements are flanges.

6. A filter according to claim 4, wherein the distance between the protruding elements is essentially equal to a length of the dimension in the flow direction of the intermediate section.

7. A filter according to claim 1, wherein the walls of the intermediate section are concave.

8. A filter according to claim 7, the separating member has a bending substantially corresponding to the curvature of the walls in the intermediate section.

9. A filter according to claim 1, wherein a center line of the intermediate section is substantially collinear with the center line of the separating member.

10. A filter according to claim 1, wherein the intermediate section has a substantially circular cross-section coplanar with the flow direction.

11. A filter according to claim 1, wherein the separating member has a substantially circular cross-section.

12. A filter according to claim 1, wherein the channels have an area of flow in the first section which is essentially equal to an area of flow in the intermediate section.

13. A filter according to claim 1, wherein two neighboring channels have intermediate sections arranged at different distances from the inlet end.

14. A filter according to claim 1, further comprising a plurality of grooves arranged on a surface of the inlet end and arranged substantially transversely to the longitudinal direction of the channels.

15. A fuel assembly for a nuclear plant of light-water model, the fuel assembly comprising a bottom part, a top part, and a plurality of fuel rods arranged next to each other with an interspace between them, the rods being arranged between the bottom part and the top part of the fuel assembly, the bottom part comprising a filter for separating particles from cooling water being circulated through the fuel assembly, the filter having an inlet end and an outlet end and adapted for permitting flowing-through of the cooling water in a main flow direction from the inlet end to the outlet end, the filter comprising a plate defining a plurality of channels extending in the flow direction from the inlet end to the outlet end, each of the channels comprising a first channel section provided closer to the inlet end, a second channel section provided closer to the outlet end, and an intermediate section provided between the first and the second channel sections, wherein:

in a first direction transversely to the flow direction, the intermediate section has a dimension which is larger than corresponding dimensions of the first and the second channel sections in said first direction, the filter comprises an elongate separating member arranged in the intermediate section, wherein the intermediate section and the separating member are arranged in spaced relation with one another so that at least one bent passage for the cooling water is formed between the separating member and a wall of the intermediate section, the channels extend in a second direction substantially in parallel to each other and transversely to said first direction and the flow direction, and the elongate separating member is cylindrical and arranged with a longitudinal axis extending in said second direction transversely to the flow direction.

16. A fuel assembly according to claim 15, wherein the filter and the bottom part are arranged for conducting the cooling water into said interspace.

* * * * *